Sept. 22, 1964
P. URBAN
3,149,920
PRODUCTION OF SULFUR
Filed July 21, 1961
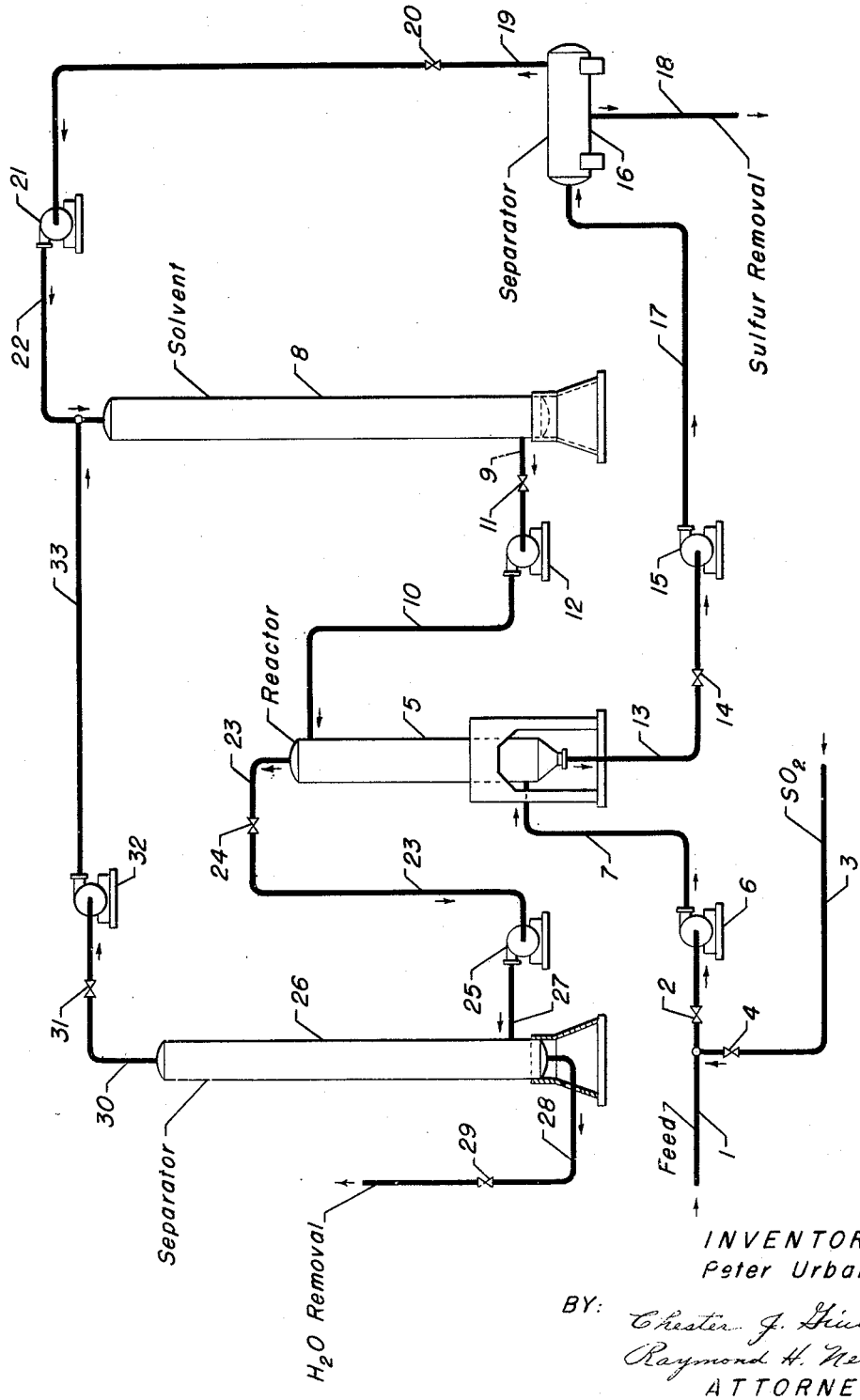
INVENTOR:
Peter Urban
BY: Chester J. Giuliani
Raymond H. Nelson
ATTORNEYS.

3,149,920
PRODUCTION OF SULFUR
Peter Urban, Northbrook, Ill., assignor to Universal Oil Products Company, Des Plaines, Ill., a corporation of Delaware
Filed July 21, 1961, Ser. No. 125,839
12 Claims. (Cl. 23—226)

This invention relates to a process for the production of sulfur and particularly to a process for producing sulfur from hydrogen sulfide. In addition, the invention also relates to a method for purifying a gas stream by removing hydrogen sulfide from said stream.

In many industrial processes large amounts of sulfur, which is a by-product of the particular reactions, are wasted by being vented to the atmosphere as hydrogen sulfide. Typical of these industrial processes are those for preparing various petroleum products, coking of coal, manufacture of steel and others. In many cases, and particularly in the refining of gasoline, the sulfur is a contaminant in the ultimate desired product and, if in the form of organic sulfur compounds such as the mercaptans, is converted to hydrogen sulfide during the process of the charge stocks and is subsequently disposed of in that form. Besides being wasteful of a potentially useful source of sulfur, the venting of hydrogen sulfide to the atmosphere creates a nuisance due to its unpleasant odor, which nuisance must be abated in many communities in order to conform to local ordinances and/or regulations pertaining thereto.

Several solutions to this problem have been put into effect and these solutions are concerned in the most part with the abatement of the nuisance rather than the conservation or production of the sulfur. The latter processes are usually difficult to effect and, in the most part, are relatively costly inasmuch as said processes usually consist of converting the hydrogen sulfide formed during the particular manufacturing or refining operation to sulfur, sulfuric acid or to some other form of sulfur which is salable to other industries which require the presence of sulfur in their particular operation. One such solution has been to separate the hydrogen sulfide from the main stream by such means as an absorber employing an alkaline liquid such as an amine or metal hydroxide solution in countercurrent contact with the hydrogen sulfide-containing gas. The absorbing liquid is then stripped of hydrogen sulfide and the hydrogen sulfide is partially burned to form sulfur dioxide and water, the remainder of the hydrogen sulfide being reacted with sulfur dioxide to produce sulfur and water. The reaction is effected at high temperatures and preferably at high pressures while utilizing a heterogeneous catalyst. This method has many unsatisfactory features including the expense and difficulty of concentrating hydrogen sulfide by means of an alkaline solution with subsequent stripping, the use of heterogeneous catalysts which are not too well suited to chemical processes resulting in solid products, the difficulty of using corrosive materials such as water-sulfur dioxide mixtures at high temperatures and, in fact, the added difficulty of employing high temperatures with the attendant cost of providing heating means and maintaining these means at the required temperatures. In addition, other prior art methods have employed a hygroscopic solvent wherein the sulfur dioxide and hydrogen sulfide may be dissolved and reacted in the presence of a catalytic amount of water to form sulfur. However, the solvents which have been used consisted of organic hydroxy materials such as mono- and polyalcohols, one particular type of solvents which were used comprising ethylene glycol, diethylene glycol, triethylene glycol, etc. A disadvantage of using solvents of this type, particularly those of low molecular weight, is that this type of solvent is relatively expensive and, in order to make the process commercially feasible, must be recovered and recycled to the reactor, thus necessitating the added expense of a solvent recovery system which must operate at peak efficiency.

Yet another form of obtaining or producing sulfur is to react hydrogen sulfide and sulfur dioxide in the presence of a hydrocarbon solvent which is water saturated and in addition contains a catalytic amount of free water. However, a disadvantage in this recovery system as well as the glycol recovery system is that a water-sulfur dioxide combination is corrosive in nature and therefore the corrosion problem will constitute a major factor in plant maintenance and replacement of apparatus or equipment costs.

It is therefore an object of this invention to provide a process for recovering substantially pure sulfur in an easily recoverable form from a gas stream containing hydrogen sulfide as the impurity thereof.

The further object of this invention is to provide a process for producing sulfur from a gas stream by providing a simple relatively low temperature process which will result in a large conversion of hydrogen sulfide to substantially pure sulfur in a relatively inexpensive method of operation.

One embodiment of this invention resides in a process for the production of sulfur which comprises treating sulfur dioxide and hydrogen sulfide at substantially anhydrous reaction conditions in the presence of an organic solvent and a structurally stable catalyst, separating and recovering the resultant sulfur.

Another embodiment of this invention resides in a process for the production of sulfur which comprises treating sulfur dioxide and hydrogen sulfide at a temperature in the range of from about 25° to about 200° C. in a substantially anhydrous medium in the presence of an organic solvent and a structurally stable catalyst comprising silica, separating and recovering the resultant sulfur.

A specific embodiment of the invention resides in a process for the production of sulfur which comprises treating sulfur dioxide and hydrogen sulfide at a temperature in the range of from about 25° to about 200° C. in a substantially anhydrous medium in the presence of toluene and a structurally stable catalyst comprising silica, separating and recovering the resultant sulfur.

A more specific embodiment is found in a process for the production of sulfur which comprises adding sulfur dioxide to a gas stream containing hydrogen sulfide, passing the resultant mixture over an initially anhydrous bed of a catalyst comprising a composition of from about 0.25 to about 5% of alumina in a silica base, said catalyst having an average pore size greater than about 15 A., at a temperature in the range of from about 25° to about 200° C. to form sulfur and water, regenerating said catalyst bed by the addition of xylene whereby said water is azeotroped and said sulfur is dissolved therefrom, and recovering said sulfur.

Other objects and embodiments referring to alternative catalysts and alternative organic solvents will be found in the following further detailed description of this invention.

As hereinbefore set forth, it has now been discovered that sulfur may be produced by removing hydrogen sulfide from a refinery gas or natural gas stream by reacting said hydrogen sulfide with sulfur dioxide in a substantially anhydrous medium in the presence of a catalytic composition of matter and an organic solvent. Various hydrocarbon solvents may be utilized for this process, examples of such solvents which are characterized by containing only carbon and hydrogen atoms include aromatic compounds such as benzene, toluene, o-xylene, m-xylene, p-xylene, ethylbenzene, etc.; straight chain paraffins such as n-pentane, isopentane, the isomeric hexanes, heptanes, octanes, nonanes, decanes, undecanes, etc.; cyclic paraffins such as cyclopentane, cyclohexane, cycloheptane, methylcyclopentane, methylcyclohexane, etc.; olefinic hydrocarbons such as 1-pentene, 2-pentene, 1,2-pentadiene, 1,3-pentadiene, 1-hexene, 2-hexene, 3-hexene, 1,2-hexadiene, 1,3-hexadiene, the isomeric heptanes, heptadienes, octenes, octadienes, nonenes, nonadienes, etc.; cyclopentene, cyclopentadiene, cyclohexene, cyclohexadiene, etc., styrene, the allylbenzenes, etc., and mixtures of the above-mentioned solvents. It is to be understood that the above enumerated hydrocarbons are only representative of the type of solvents which may be used and that the process of the present invention is not necessarily limited to these hydrocarbons. Many of the solvents of this type are relatively inexpensive and therefore the cost of the operation will be greatly minimized. Furthermore, many of the solvents are readily available at the site of the process and will thus further reduce the cost of the operation inasmuch as transportation costs will not be involved. In addition, another advantage of utilizing a solvent of the type hereinbefore set forth is that the sulfur thus produced is in a granular form which is easily separable from the liquid phase and will be more readily recoverable than will sulfur which is produced in other types of prior art processes such as the glycol process, the sulfur thus produced in such a system being in a colloidal state which is difficult to recover. Therefore, the equipment which is required for separating the sulfur produced will be of a relatively more simple design and reduced cost.

The process of this invention which is carried out in a substantially anhydrous medium and in the presence of a catalyst which is structurally stable in the presence of sulfur, is acidic in nature and which, in the preferred form, comprises a refractory metal oxide may be utilized to separate out the sulfur in either a continuous or cyclic type of operation. The catalysts which are utilized in the process of the present invention include silica, alumina, silica - alumina, silica - zirconia, silica - alumina - zirconia, silica-magnesia, silica-boria, silica-magnesia-alumina, etc. The preferred catalysts are those having a pore size greater than 15 A. and a composition comprising a major proportion of silica and a minor proportion of another metal oxide such as a composition containing from about 0.25 to about 5% of alumina in a silica base.

The process of this invention is effected at temperatures ranging from ambient or room temperature (25° C.) up to 200° C. or more. For example, if the process is to be effected in a cyclic type of operation, the gas stream containing sulfur dioxide which has been added to said gas stream prior to introduction into the reaction vessel is passed over a bed of the desired catalyst which is in an initially anhydrous condition at ambient temperatures. It has now been unexpectedly discovered that the catalyst particles, unlike most catalysts which when coated with a monomolecular film of contaminant on the surface thereof will lose their activity, will still maintain their activity and may be used until approximately 30 weight percent of sulfur based on the original weight of the catalyst is deposited thereon. When the aforesaid amount of sulfur is deposited on the catalyst, the dehydrating and desulfurization of the bed at elevated temperatures ranging from about 50° to about 200° C. or more is begun by passing an azeotroping solvent over the catalyst bed, thereby producing a desired gas stream containing a minimum amount of water and which is sweet, or is controlled so as to produce a nearly sweet gas stream. This has the effect of regenerating the catalyst bed which is then in an initially anhydrous state and is free of sulfur and thus is in condition for another batch type operation. The dissolved sulfur is withdrawn from the bottom of the bed and passed to a sulfur recovery system while the azeotroped water is withdrawn from the upper portion of the reactor and passed to a condenser where the water is separated from the solvent, the latter being recovered and recycled for further use.

It is also contemplated within the scope of this invention that the process may be effected in a continuous type operation in which a mixture of sulfur dioxide in a gas stream which contains hydrogen sulfide as a contaminant therein is pumped into a reaction zone maintained at an elevated temperature and which contains a catalyst of the type hereinbefore set forth. The sulfur dioxide and hydrogen sulfide react to form water and sulfur. The gas stream, free of contaminants, is passed up through the reactor and recovered as a sweet or nearly sweet gas stream. The desired solvent passes over the catalyst bed dissolving the sulfur while a portion of the solvent azeotropes the water which may be passed to a condenser and treated in a manner similar to that hereinbefore set forth.

The process of this invention may be best described with reference to the accompanying drawing which is intended to be illustrative of the invention rather than limiting the broad scope thereof.

Referring now to the drawing which is a diagrammatic flow scheme, a feed stock comprising a gas stream or any other feed which contains hydrogen sulfide as a contaminant thereof passes through line 1 containing valve 2. Therein it is mixed with a desired amount of sulfur dioxide which is charged through line 3 provided with valve 4. The feed stock containing, as a contaminant, hydrogen sulfide, which is admixed with the sulfur dioxide is pumped into reactor 5 by means of pump 6 located in lines 1 and 7. The reactor which is provided with a catalyst of the type hereinbefore set forth is maintained at the proper operating conditions of temperature and pressure. The sulfur dioxide and hydrogen sulfide react in the aforesaid reactor to form sulfur and water. An azeotroping solvent also of the type hereinbefore set forth contained in solvent tank 8 is charged to the upper portion of the reactor through lines 9 and 10 provided with valve 11 and pump 12. The solvent in its downward flow through the catalyst bed dissolves the sulfur which is formed therein, the dissolved sulfur in the solvent being withdrawn from the bottom of reactor 5 through line 13 provided with valve 14 and pump 15 and is passed into sulfur separator 16 through line 17, said separator being of any type known in the art. In separator 16 the sulfur is separated from the solvent and withdrawn through line 18 to storage. The azeotroping solvent which has been separated from the sulfur is withdrawn from the separator 16 through line 19 provided with valve 20 and pump 21 and recycled to solvent tank 8 through line 22. In reactor 5 one portion of the solvent azeotropes the water, the mixture being withdrawn from the top of reactor 5 through line 23 provided with valve 24 and pump 25 and is passed to a separation zone 26 through line 27, one form of said separation zone may comprise a condenser in which the water is condensed out and removed through line 28 provided with valve 29. The solvent which has been separated from the water is withdrawn from separator 26 through line 30 provided with valve 31 and pump 32 and is recycled along with the solvent recovered from the sulfur separator back to solvent tank 8 through lines 33 and 22.

The following examples are given to illustrate the process of the present invention which, however, are not intended to limit the generally broad scope of the present invention in strict accordance therewith.

*Example I*

In this example 25 g. of commercial activated bauxite which consists of alumina was placed in a reaction vessel. The vessel was maintained at ambient temperature while a mixed stream of hydrogen sulfide and sulfur dioxide was passed therethrough for a period of one hour. At the end of this time the gas stream was stopped, and the catalyst which was loaded up with sulfur was removed. The sulfur was recovered and it was found that there was an 86% conversion based on the total amount of hydrogen sulfide charged to the reactor.

*Example II*

In this example 25 g. of activated bauxite was placed in a reaction vessel while a stream of sulfur dioxide and hydrogen sulfide was passed therethrough. The reactor was maintained at a temperature of about 115°–120° C. while 100 cc. of xylene per hour was passed over the catalyst bed in a downflow. The sulfur dissolved in a portion of the xylene was recovered, the xylene was separated and the sulfur weighed. There was an 81.6% conversion of hydrogen sulfide based on the charge.

*Example III*

A catalyst comprising a mixture of 0.5% alumina and 99.5% silica was utilized, 25 g. of this catalyst being placed in a reaction vessel. The vessel was maintained at ambient temperature while the stream of hydrogen sulfide and sulfur dioxide was passed therethrough for a period of one hour. At the end of this time when the bed was loaded with sulfur, the charge flow was discontinued, the reactor was heated to a temperature of about 115° C. and xylene was passed over said bed. A portion of the xylene dissolved the sulfur, the latter being withdrawn, separated from the xylene and weighed. It was found that there was a 91% conversion of the sulfur. Another portion of the xylene azeotroped the water which was formed during the reaction, and the water-xylene mixture was withdrawn to a condenser. The water was collected in a water trap while the xylene was recovered for further use as a solvent.

*Example IV*

To illustrate the ability of the catalyst, which contains a predominate proportion of silica, to operate with a relatively high degree of efficiency while being loaded with sulfur, the following experiments were performed. 9.5 g. of a catalyst consisting of 0.5% alumina and 99.5% silica was subjected to the action of a combined hydrogen sulfide-sulfur dioxide gas stream at amibent temperature. Upon completion of the run, it was found that the catalyst contained 22% sulfur by weight of the catalyst.

I claim as my invention:

1. A process for the production of sulfur which comprises adding sulfur dioxide to a gas stream containing hydrogen sulfide, passing the resultant mixture over an initially anhydrous bed of a catalytic composition of from about 0.25 to about 5% of alumina in a silica base, said catalyst having an average pore size greater than about 15 A., at a temperature in the range of from about 25° to about 200° C., threreby depositing sulfur and water in the catalyst bed, regenerating said catalyst bed by the addition of xylene whereby said water is azeotroped and said sulfur is dissolved therefrom, and recovering said sulfur.

2. A process for producing sulfur which comprises reacting hydrogen sulfide and sulfur dioxide in contact with an initially anhydrous bed of structurally stable catalyst predominating in an acidic refractory oxide selected from the group consisting of silica, alumina and a mixture of silica and alumina, thereby depositing sulfur and water in the catalyst bed, passing an anhydrous organic solvent through said bed to dissolve the deposited sulfur and azeotrope the water, separately removing the resultant solution and azeotrope from the catalyst bed, and thereafter separating the sulfur from the solvent.

3. The process of claim 2 further characterized in that said solvent is passed through the catalyst bed during the reaction of the hydrogen sulfide and sulfur dioxide in contact with the bed.

4. The process of claim 2 further characterized in that said solvent is passed through the catalyst bed after completion of the reaction of the hydrogen sulfide and sulfur dioxide in contact with the bed.

5. The process of claim 2 further characterized in that said catalyst is a mixture of silica and alumina.

6. The process of claim 2 further characterized in that said catalyst consists essentially of silica.

7. The process of claim 2 further characterized in that said catalyst consists essentially of alumina.

8. The process of claim 2 further characterized in that said solvent is a hydrocarbon liquid.

9. The process of claim 2 further characterized in that said solvent comprises xylene.

10. A process for producing sulfur which comprises reacting hydrogen sulfide and sulfur dioxide at a temperature or from about 25° to about 200° C. in contact with an initially anhydrous bed of predominantly silica catalyst, thereby depositing sulfur and water in the catalyst bed, passing an anhydrous hydrocarbon solvent through said bed to dissolve the deposited sulfur and azeotrope the water, separately removing the resultant solution and azeotrope from the catalyst bed, and thereafter separating the sulfur from the solvent.

11. A process for producing sulfur which comprises reacting hydrogen sulfide and sulfur dioxide at a temperature of from about 25° to about 200° C. in contact with an initially anhydrous bed of predominantly alumina catalyst, thereby depositing sulfur and water in the catalyst bed, passing an anhydrous hydrocarbon solvent through said bed to dissolve the deposited sulfur and azeotrope the water, separately removing the resultant solution and azeotrope from the catalyst bed, and thereafter separating the sulfur from the solvent.

12. A process for producing sulfur which comprises reacting hydrogen sulfide and sulfur dioxide at a temperature of from about 25° to about 200° C. in contact with an initially anhydrous bed of silica-alumina catalyst, thereby depositing sulfur and water in the catalyst bed, passing an anhydrous hydrocarbon solvent through said bed to dissolve the deposited sulfur and azeotrope the water, separately removing the resultant solution and azeotrope from the catalyst bed, and thereafter separating the sulfur from the solvent.

References Cited in the file of this patent

UNITED STATES PATENTS

| | | |
|---|---|---|
| 2,767,062 | Duecker | Oct. 16, 1956 |
| 2,987,379 | Urban | June 6, 1961 |
| 2,992,076 | Thompson et al. | July 11, 1961 |